May 15, 1923.
A. P. MALLOY, JR
SHOCK ABSORBER
Filed Feb. 13, 1922
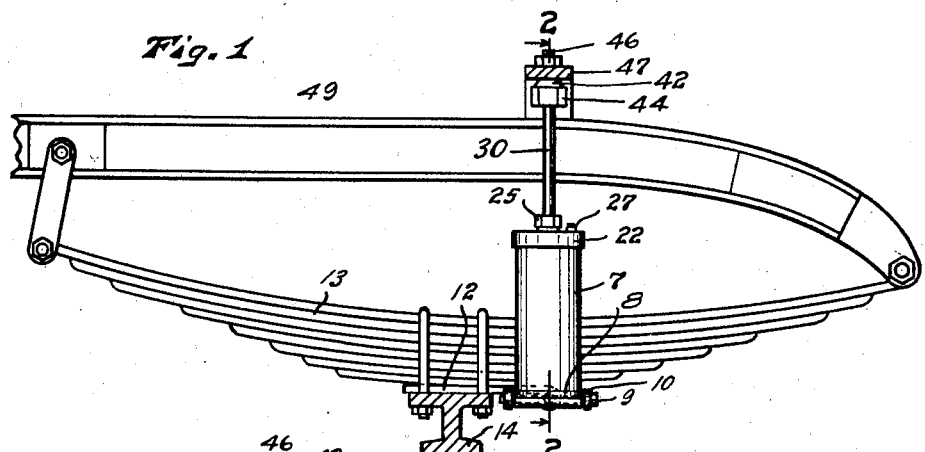
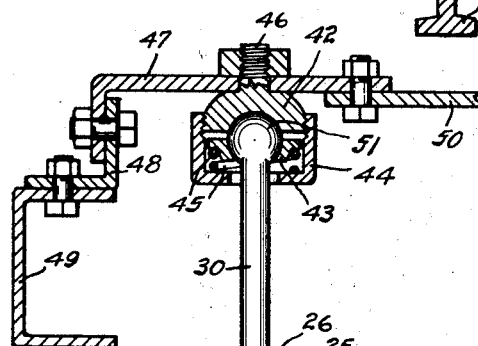
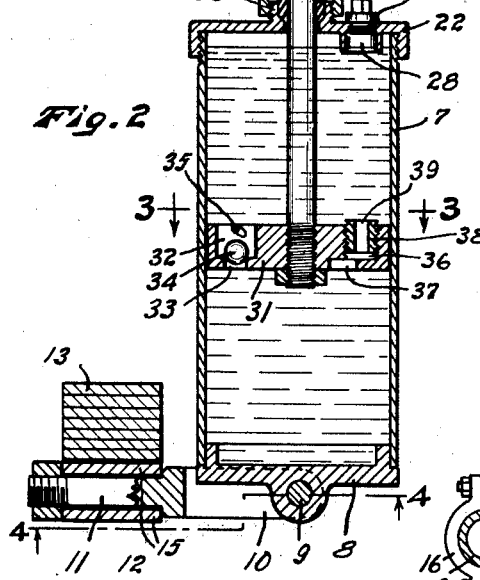
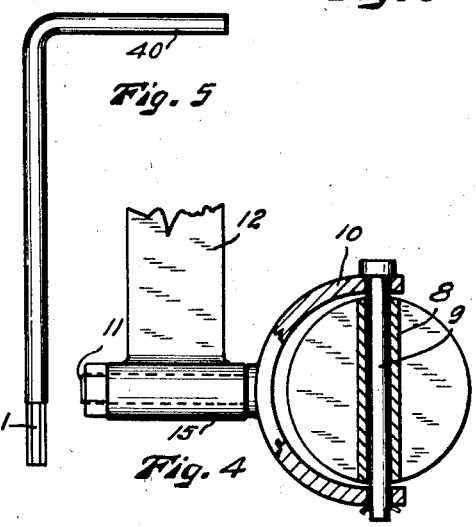
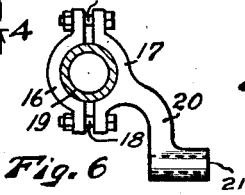
INVENTOR
Angus P Malloy Jr.
BY
Fred C Matheny
ATTORNEY Patented May 15, 1923.

1,454,973

UNITED STATES PATENT OFFICE.

ANGUS P. MALLOY, JR., OF SEATTLE, WASHINGTON.

SHOCK ABSORBER.

Application filed February 13, 1922. Serial No. 536,089.

*To all whom it may concern:*

Be it known that I, ANGUS P. MALLOY, Jr., a citizen of the United States, residing at Seattle, in the county of King and State of Washington, have invented a certain new and useful Improvement in Shock Absorbers, of which the following is a specification.

My invention relates to improvements in shock absorbers of the type that are intended primarily for use in connection with the springs of motor vehicles and the object of my improvement is to provide a shock absorber having a hydraulic cylinder and a piston movable therein, said piston being provided with liquid by-pass means of novel construction that may be quickly and easily adjusted from the exterior of the cylinder to regulate the area of the by-pass opening through said piston.

Another object is to provide a shock absorber of this type having means for preventing the loss of liquid from a hydraulic cylinder due to the reciprocation therein of a piston rod that passes through a packing box or gland in the upper end of the cylinder.

Another object is to provide means within a hydraulic cylinder of this nature that will automatically operate to prevent the cylinder from being filled entirely full of liquid during the process of filling the same, thereby eliminating the danger of filling the cylinder so full of liquid when the piston rod is withdrawn therefrom that there will not be enough expansion space left to compensate for the displacement of the piston rod when said piston rod is thrust into the cylinder.

A further object is to provide novel and efficient means for connecting the two ends of the shock absorber to the two relatively vibratory parts of the motor vehicle.

Still further objects are to provide a shock absorber that is neat in appearance, simple and durable in construction, reliable and efficient in operation, not expensive to manufacture and comparatively easy to install on motor vehicles of the usual type of construction.

With the above and other objects in view, the invention consists in the novel construction, adaptation and combination of parts of a hydraulic shock absorber, as will be more clearly hereinafter described and claimed.

In the accompanying drawings Figure 1 is a view in elevation showing my shock absorber as applied to a motor vehicle, a spring and a fragment only of the motor vehicle frame being shown.

Fig. 2 is an enlarged view in vertical section substantially on broken line 2—2 of Fig. 1.

Fig. 3 is an enlarged sectional view substantially on broken line 3—3 of Fig. 2, parts being shown in elevation.

Fig. 4 is a view partly in cross section and partly in elevation substantially on broken line 4—4 of Fig. 2.

Fig. 5 is a view in elevation of a device used for adjusting certain by-pass mechanism on the interior of the hydraulic cylinder.

Fig. 6 is a view in elevation of a bracket that may be used in attaching the shock absorber to a cylindrical member, as an axle housing.

Like reference numerals designate like parts throughout the several views:

Referring to the drawings, the numeral 7 designates a hydraulic cylinder having a rigidly secured bottom end 8 that is provided with a transverse pivot 9 by which it is connected with a forked bracket 10 that terminates in a cylindrical shank 11. The shank 11 is arranged to fit within a suitable hole in a bracket member that may be secured to one of two relatively reciprocable parts, said bracket member, as shown in Figs. 1, 2 and 4 being a substantially flat piece of metal 12 that may be clamped between a vehicle spring 13 and an axle 14 and that has at one end an eyelet 15 for the reception of the shank 11. The axes of the pin 9 and shank 11 are at substantially right angles to each other, thereby affording a substantially universal movement to the cylinder 7.

The cylinder 7 is provided at its top end with a screw cap 22 having a centrally disposed upwardly projecting tubular boss 23 that is internally recessed for the reception of packing material 24 and that is externally threaded for the reception of a nut 25, said nut 25 having on its upper side a concave recess 26 wherein any liquid that adheres to a cylindrical reciprocating piston rod and is drawn past the packing 24 may collect.

The screw cap 22 is provided at a point removed from the center with an internally threaded liquid inlet opening that is arranged to be closed by a screw plug 27, said opening being surrounded on the inner or bottom side of the screw cap 22 by a tubular member 28 that may be integral with or otherwise fixedly secured to the screw cap and that projects downwardly therefrom a short distance to prevent the cylinder from being poured entirely full of liquid.

Secured to the end of a piston rod 30 and reciprocably disposed within the cylinder 7 is a piston 31 that is provided on the upper side with a cavity 32 which converges at its bottom end to form a seat 33 for a ball 34 that is loosely retained within the cavity by a pin 35 in such a manner as to form a check valve that will permit liquid to flow freely through the piston as the piston moves downwardly in the cylinder but that will close as the piston moves upwardly in the cylinder.

The piston 31 is also provided with a bypass of adjustable area that permits liquid to flow freely therethrough in either direction, such by-pass being formed by two intersecting passageways 36 and 37 that are drilled from opposite sides of the piston and that are offset with respect to each other so that only a small portion of the circumferential areas of said two passageways overlap or register, one of said passageways, as the upper passageway 36 being internally threaded and having a valve plug 38 screwed therein and the plug 38 having a longitudinal passageway 39 preferably of polygonal or otherwise than circular cross-sectional shape. The plug 38 may be adjusted by turning to regulate the rate of flow of liquid through the by-pass. The plug 38 is turned by means of a specially constructed wrench 40 having a polygonal end 41 that may be inserted through the liquid inlet opening in the screw cap 22 and engaged within the passageway 39 in the plug 38. When the shock absorber is assembled the piston rod 30 is preferably marked in such a manner as to enable a person who desires to adjust the valve plug 38 to first turn such plug into alignment with the liquid inlet opening in the screw cap 22 so that the wrench 40 may be easily engaged within the passageway 39 in the plug.

The manner hereinbefore described of adjusting the area of the opening through the piston 31 is especially advantageous in a shock absorber of this nature for the reason that it places the adjusting means out of sight and removes the temptation for the novice to tamper and experiment with the same and yet provides adjusting means that is quickly and easily accessible to persons that are thoroughly familiar with construction of the shock absorber.

The piston rod 30 terminates at its upper end in a ball 51 that is arranged to fit within a socket formed by two concave blocks 42 and 43. The block 42 is externally threaded for the reception of a hollow fitting 44 and the block 43 is disposed within the fitting 44 and is supported therefrom by a spring 45 which allows a limited amount of vibration within the universal joint proper. The block 42 terminates at its upper side in a stud 46 that is secured to an angular bracket member 47 which is connected with another bracket member 48 that is secured to a vehicle frame bar 49. The bracket member 47 may be connected by a cross bar 50 with another corresponding bracket member on the opposite side of the motor vehicle.

In Fig. 6, I have shown a bracket that may be used in attaching the shock absorber to a cylindrical member, said bracket comprising two concave parts 16 and 17 arranged to be clamped by bolts 18 onto an axle housing 19, one of said concave parts having integral arm 20 that terminates in an eyelet 21 for the reception of the shank 11.

In operation as the two relatively vibratory members 14 and 49 move toward each other the piston 31 will move downwardly in the cylinder 7 and the liquid in such cylinder will flow upwardly through such piston freely through both the check valve and the by-pass, and will offer just enough resistance to such downward movement to slow up or check the movement of compression of the spring. At the instane the rebound or upward throw of the vehicle body begins the check valve 34 will close, thus leaving only the by-pass openings 36 and 37 for the liquid to flow through as the piston moves upwardly so that the piston will exert a retarding effect and slow up the rebound, thereby preventing the body of the vehicle from being thrown upwardly with violence on the rebound of the spring. On smooth roads the piston 31 will vibrate within the cylinder without lending appreciable stiffness to the springs.

The quickly adjustable by-pass means make it possible to easily adjust this shock absorber for various types of vehicles, and conditions of service and yet do not readily admit of being tampered with by a novice.

The cone shaped recess 26 in the nut 25 through which the piston rod 30 passes collects liquid that is drawn upwardly past the packing 24 and causes such liquid to be returned to the interior of the cylinder 7, thereby preventing the supply of liquid in such cylinder from being depleted and also preventing the liquid from running down over the sides of the cylinder 7. In practice I have found that a considerable saving of liquid is made in this manner.

It will be understood that as the piston rod 30 is thrust into the cylinder 7 it will displace an equal volume of liquid and that if the cylinder is entirely filled with liquid when the piston is near the upper end of the same it will leave no room for displacement of liquid by the piston rod and will consequently prevent the piston rod from being thrust into the cylinder. To prevent this error from being made by inexperienced persons in filling the cylinder I have provided the downwardly projecting tubular member 28 which will prevent the cylinder from being entirely filled and will leave an expansion area in the upper portion thereof.

The liquid used in the cylinder 7 will preferably be a lubricant that is not greatly affected by changes of temperature. I have found that glycerine is very satisfactory for this purpose.

The universal connections at both ends of the device insure freedom of movement and relieve any possibility of strain on the various parts.

It will be observed that the piston rod 30 reciprocates through the top end of this cylinder and that there are no openings in the lower portions of the cylinder through which the liquid may leak out.

The foregoing description and the accompanying drawings clearly set forth the plan of construction and method of operation of this shock absorber but, while I have shown and described what I now consider to be the preferred form of the invention, it will be understood that the disclosure is merely illustrative and that such changes in the form, dimensions and arrangement of parts of the device may be made as are within the scope of the claims.

What I claim is:—

1. The combination with two relatively vibratory members, of a hydraulic cylinder arranged to be secured to one of said vibratory members, a piston reciprocable in said cylinder, a piston rod connected with said piston and having its outer end secured to the other vibratory member, a liquid bypass extending through said piston, a valve plug for regulating the area of opening of said by-pass and a cover for said cylinder, said cover having an opening capable of being aligned with said screw plug to permit the adjustment of said valve plug.

2. A shock absorber embodying a cylinder arranged to be filled with liquid, a piston reciprocable in said cylinder, said piston having a by-pass of adjustable area extending therethrough, the by-pass consisting of two perforations that extend inwardly from opposite sides of said piston in offset relation with respect to each other so that the circumferential portions only of said perforations intersect and an adjustable tubular plug threaded into one of said perforations.

3. A shock absorber embodying a liquid receiving cylinder, a cap for the upper end of said cylinder, a piston rod reciprocable through said cap, a piston secured to said rod and reciprocable in said cylinder, said piston having a by-pass of adjustable area extending therethrough, the by-pass consisting of two intersecting perforations that extend inwardly from opposite sides of said piston in offset relation with respect to each other whereby only the circumferential portions of said perforations register, a valve plug arranged to screw into the upper one of said perforations, said plug having a longitudinal passageway therein, a removable screw plug in said cylinder cap at the same radial distance from said piston rod as said valve plug in said piston to permit the adjustment of said valve plug, and a check valve arranged to permit a relatively free upward flow of liquid through said piston.

4. The combination with a shock absorber including a liquid receiving cylinder, of a reciprocable piston rod projecting into the upper end of said cylinder, a piston on said piston rod, means for permitting the passage of liquid through said piston, a cap for the upper end of said cylinder, said cap having a liquid inlet opening therein, means for closing said liquid inlet opening and a tubular member surrounding said liquid inlet opening and projecting into said cylinder to limit the amount of liquid that may be poured into said cylinder.

ANGUS P. MALLOY, Jr.